(12) United States Patent
Fraczak et al.

(10) Patent No.: US 9,626,427 B2
(45) Date of Patent: *Apr. 18, 2017

(54) SYSTEM FOR EXTRACTING CUSTOMER FEEDBACK FROM A MICROBLOG SITE

(71) Applicant: Benbria Corporation, Ottawa OT (CA)

(72) Inventors: Wojciech Fraczak, Gatineau (CA); Ying Du, Ottawa (CA)

(73) Assignee: Benbria Corporation, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/041,286

(22) Filed: Feb. 11, 2016

(65) Prior Publication Data

US 2016/0162570 A1 Jun. 9, 2016

Related U.S. Application Data

(63) Continuation of application No. 14/589,080, filed on Jan. 5, 2015, now Pat. No. 9,292,598, which is a (Continued)

(51) Int. Cl.
| | |
|---|---|
| *G06F 7/00* | (2006.01) |
| *G06F 17/30* | (2006.01) |
| *G06Q 30/02* | (2012.01) |
| *G06N 7/00* | (2006.01) |
| *G06N 99/00* | (2010.01) |
| *H04L 12/26* | (2006.01) |
| *G06Q 10/06* | (2012.01) |
| *G06F 13/14* | (2006.01) |

(52) U.S. Cl.
CPC .. *G06F 17/30598* (2013.01); *G06F 17/30699* (2013.01); *G06F 17/30867* (2013.01); *G06N 7/005* (2013.01); *G06N 99/005* (2013.01); *G06Q 10/063* (2013.01); *G06Q 30/02* (2013.01); *H04L 43/04* (2013.01)

(58) Field of Classification Search
CPC ......... G06F 17/30699; G06F 17/30867; G06F 17/2235; G06F 17/30053; G06F 17/30772; G06F 17/218; G06F 17/30011; G06F 17/30014; G06F 17/3061; G06F 17/30855
USPC .......... 707/737, E17.046, E17.089, E17.109, 707/E17.008, E17.044, E17.141, 805
See application file for complete search history.

(56) References Cited

U.S. PATENT DOCUMENTS

| | | |
|---|---|---|
| 7,034,691 B1 | 4/2006 | Rapaport |
| 8,364,840 B2 | 1/2013 | Barros |

(Continued)

FOREIGN PATENT DOCUMENTS

WO   WO 2009/070882   6/2009

*Primary Examiner* — Usmaan Saeed
*Assistant Examiner* — Cecile Vo
(74) *Attorney, Agent, or Firm* — Nixon Peabody LLP

(57) ABSTRACT

A system for extracting customer feedback from a microblog site includes a retrieval unit coupled to the microblog site to capture microblog updates. A filter unit coupled to the retrieval unit filters the captured microblog updates according to filter criteria that remove non-actionable items from the captured microblog updates. A learning unit coupled to the filter unit prioritizes the filtered microblog updates, and a classification unit coupled to the learning unit classifies the filtered and prioritized microblog updates. An action unit coupled to the classification unit performs appropriate actions based on the classified, filtered and prioritized microblog updates.

10 Claims, 16 Drawing Sheets

Related U.S. Application Data continuation of application No. 13/458,527, filed on Apr. 27, 2012, now Pat. No. 8,943,061.

(56) References Cited

U.S. PATENT DOCUMENTS

| | | |
|---|---|---|
| 8,595,302 B2 | 11/2013 | Krishnamurthi |
| 8,600,796 B1* | 12/2013 | Sterne ................ G06Q 30/0201 705/7.29 |
| 2002/0112035 A1* | 8/2002 | Carey ............... G06F 17/30867 709/219 |
| 2003/0217109 A1 | 11/2003 | Ordille |
| 2004/0114735 A1 | 6/2004 | Arning |
| 2004/0193617 A1 | 9/2004 | Adler |
| 2006/0109113 A1 | 5/2006 | Reyes |
| 2006/0234672 A1 | 10/2006 | Adler |
| 2006/0271675 A1 | 11/2006 | Wakazono |
| 2006/0273893 A1 | 12/2006 | Warner |
| 2007/0019616 A1 | 1/2007 | Rantapuska |
| 2007/0107059 A1 | 5/2007 | Chasin |
| 2007/0130363 A1 | 6/2007 | Barros |
| 2009/0034696 A1 | 2/2009 | Ramanathan |
| 2009/0055220 A1 | 2/2009 | Rapaport |
| 2009/0258678 A1 | 10/2009 | Chava |
| 2009/0276712 A1 | 11/2009 | Gregory |
| 2009/0300690 A1 | 12/2009 | Xu |
| 2009/0325538 A1 | 12/2009 | Senett |
| 2010/0146057 A1 | 6/2010 | Abu-Hakima |
| 2010/0169159 A1* | 7/2010 | Rose ..................... G06Q 30/02 705/7.29 |
| 2010/0199188 A1 | 8/2010 | Abu-Hakima |
| 2010/0306061 A1 | 12/2010 | Wagner |
| 2011/0029615 A1 | 2/2011 | Shaffer |
| 2011/0093544 A1 | 4/2011 | Yasrebi |
| 2011/0258560 A1* | 10/2011 | Mercuri ............. G06F 17/3089 715/753 |
| 2011/0276513 A1* | 11/2011 | Erhart .............. G06F 17/30539 705/347 |
| 2012/0072844 A1 | 3/2012 | Des Courtis |
| 2012/0089692 A1 | 4/2012 | Stoddard |

\* cited by examiner

Fig. 4

SYSTEM FOR EXTRACTING CUSTOMER FEEDBACK FROM A MICROBLOG SITE

This application is a continuation of and claims priority to U.S. patent application No. 14/589,080, filed Jan. 5, 2015, now allowed U.S. Pat. No. 9,292,598, which is a continuation of U.S. patent application No. 13/458,527, filed Apr. 27, 2012, now U.S. Pat. No. 8,943,061, each of which is hereby incorporated herein in its entirety.

FIELD OF THE INVENTION

The present invention relates to systems and methods for extracting customer feedback from microblog sites.

BACKGROUND OF THE INVENTION

Microblogging is a form of blogging where authors or "microbloggers" post brief updates for friends and interested observers. Microbloggers post updates via text messaging, instant messaging (IM), email, on the web or via mobile/desktop applications or via the APIs provided by the social media network or microblog site. Microbloggers rapidly disseminate information by updating their blogs continuously within a single day, with information such as activity descriptions, expressions of opinion or status updates. Technologies such as hashtags, mentions (for example by using the '@' sign to directly address another person in Twitter®) and short URLs have further improved the information-bearing capacity of microblogs. It is also possible to add rich media such as photographs, music, video and other applications to a microblog update.

The growth of microblogging has posed important business challenges. Traditionally, customer complaints and feedback was achieved through methods such as filling surveys, speaking directly with a manager, or calling a customer hotline. These methods could be tedious, especially for disgruntled customers. While it was not ideal for the business to lose valuable feedback that could otherwise be acted upon, the damage to its reputation was minimal as unhappy customers could only bad mouth it to a limited number of people in their social circle.

However, the growth of microblogging means that satisfied and dissatisfied customers can update their blogs to express satisfaction or frustration with their treatment by a particular business immediately and publicly to a wide circle of followers. Followers may then further disseminate these messages quickly, causing rapid shifts in customer behaviour. Dissatisfied customers, could make remarks which quickly and negatively impact a particular business. To worsen the problem, customer complaints are also effectively invisible to a business which relies on traditional customer feedback avenues.

Therefore, there exists a need for full-time monitoring of microblogs so that businesses can receive feedback to improve customer service. For example, a business can quickly join a conversation and remedy the situation by having the right people inside an organization connect directly with the dissatisfied customers. Furthermore, full-time monitoring of microblogs can enable a business to obtain vital competitive intelligence.

SUMMARY

According to one embodiment, a system for extracting customer feedback from a microblog site includes a retrieval unit coupled to the microblog site to capture microblog updates, a filter unit coupled to the retrieval unit to filter the captured microblog updates according to filter criteria that remove non-actionable items from the captured microblog updates, a learning unit coupled to the filter unit to prioritize the filtered microblog updates, a classification unit coupled to the learning unit to classify the filtered and prioritized microblog updates, and an action unit coupled to the classification unit to perform appropriate actions based on the classified, filtered and prioritized microblog updates. In one implementation, the classification unit includes a classification component and an administrator statistics component. The classification component may include a selection unit to select the filtered and prioritized microblog updates from a database, and a determination unit to determine the actionability of the filtered and prioritized microblog updates.

One embodiment of a classification unit adapted to be coupled to a microblog site to classify microblog updates includes a classification component for selecting microblog updates to be evaluated for actionability, and then determining whether each of said selected microblog updates is actionable; and an administrator statistics component coupled to the classification component for allowing an administrator to monitor the progress of selecting microblog updates to be evaluated for actionability. This classification unit may be used with a retrieval unit coupled to the microblog site to capture microblog updates, a filter unit coupled to the retrieval unit to filter the captured microblog updates according to filter criteria that remove non-actionable items from the captured microblog updates, and a learning unit coupled to the filter unit to prioritize the filtered microblog updates. In one implementation, the classification component includes a selection unit for selecting the filtered and prioritized microblog updates to be evaluated for actionability from a database, a determination unit for determining the actionability of the selected, filtered and prioritized microblog updates, and an action unit coupled to the classification unit to perform appropriate actions based on the actionability of the selected, filtered and prioritized microblog updates. The administrator statistics component may include an activity measurement tool, which may include a temporal measurement tool, a rate measurement tool and/or a microblog update evaluation tool.

BRIEF DESCRIPTION OF THE DRAWINGS

The invention will be better understood from the following description of preferred embodiments together with reference to the accompanying drawings, in which:

FIG. 1$a$ is a flow chart of one embodiment of the classification component in the flow chart of FIG. 1.

FIG. 1$b$ is a flow chart of one embodiment of the administration statistics component in the flow chart of FIG. 1.

FIG. 1$c$ is a flow chart of an alternative embodiment of a system for extracting customer feedback from a microblog site.

FIG. 1$d$ is a flow chart of another embodiment of the classification component in the flow chart of FIG. 1.

FIG. 1$e$ is a flow chart of another embodiment of the classification component in the flow chart of FIG. 1.

FIG. 1$f$ is a flow chart of another embodiment of a system for extracting customer feedback from a microblog site.

FIG. 1$g$ is a flow chart of a further embodiment of a system for extracting customer feedback from a microblog site.

FIG. 4 is an example of a variation of the classification page of FIG. 3 where the Tweets® with highest probabilities assigned during a learning stage show up first.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
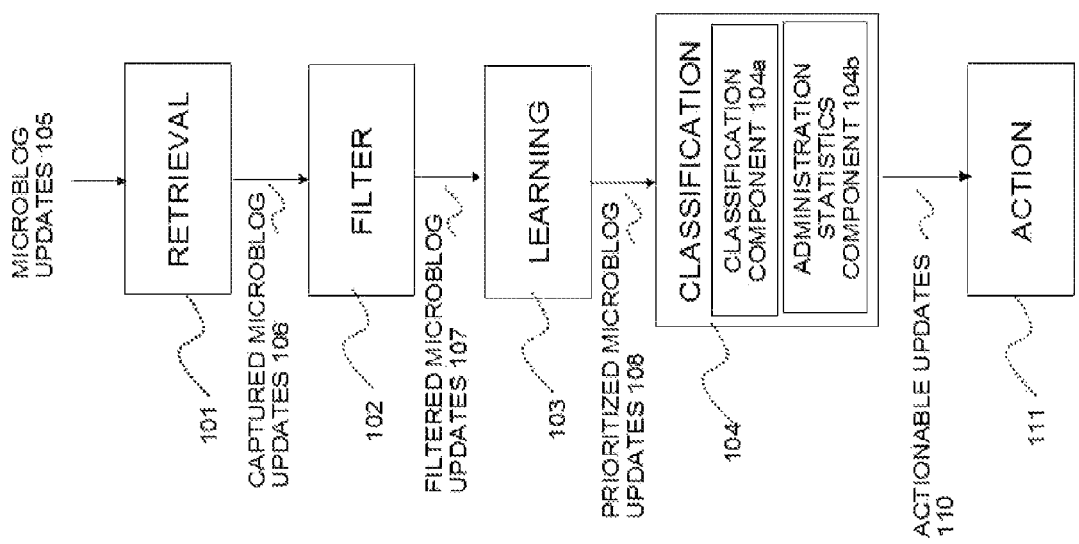
FIG. 1 is a flow chart of one embodiment of a system for extracting customer feedback from a microblog site.

FIG. 1 is a flow chart of a system and method for full-time monitoring of microblogs so that businesses can receive feedback to improve customer service or obtain vital competitive intelligence. While Twitter® and Facebook® will be referred to as examples of the microblogs being monitored, the concepts described can be applied to other microblogging and social network sites.

The illustrative microblog monitoring process filters and identifies microblog updates as actionable. Determining whether a microblog update is actionable or not depends on the objective of the business. If the objective is to address customer dissatisfaction immediately, then an actionable microblog update is one where the business can immediately resolve the concern brought up or engage the customer to find out the root cause(s) for the concern, and thus improve customer satisfaction. In the specific case of applying the monitoring process to, for example, Twitter® related to a food chain, an actionable update or Tweet® for the food chain can be broadly defined as an update that displays a clear indication that the microblogger:

1. is upset about a franchisee of the food chain,
2. has something to say to a specific food chain franchisee manager, and/or
3. has feedback regarding the brand messaging, and/or suggestions or improvements to product categories and/or new product introduction.

Other objectives may include:

1. identifying customers that are dissatisfied with a competitor's product so that targeted advertising can be directed towards those customers,
2. identifying customers that are satisfied with a product or serivce, and why they are satisfied with the product or services, so that similar behaviours can be reinforced with other customers to create positive feedback. Alternatively, similar products can be provided to other customers.

The same process could be applied to other microblogging and social network sites. For example, it could be applied to Facebook® related to a hotel chain. In one case, an actionable update could be a Facebook® status update for the hotel chain that displays a clear indication that the microblogger is upset about the service at a particular hotel location. In another case, an actionable update could be a status update that displays a clear indication that the microblogger is dissatisfied with a competing hotel chain.

As shown in FIG. 1, this process includes four stages: retrieval 101, filter 102, learning 103, classification 104 and action 111. In retrieval stage 101, microblog updates 105 matching a certain retrieval criteria are captured. The retrieval criteria can be messages containing designated keywords posted by a microblogger, messages with location metadata information (especially ones that are at or close to known locations that are of interests to the businesses), messages with other multimedia information attached. The microblog updates 105 could come from, for example, a direct feed from the microblogging or social network site, or by "scraping" microblog updates from the microblogging or social network site.

With specific application to the Twitter® monitoring process, during retrieval stage 101, Tweets® containing designated keywords (for example the name of a food chain etc.) posted by any Twitter® microblogger will be captured using Twitter's public Search API. This process can be accelerated by searching using the hashtag feature in Twitter®. Furthermore, Tweets® that are posted near locations of interests can also be captured.

This could also be applied to other microblogging and social network sites. For example, in the case of Facebook® for a hotel chain, status updates containing designated keywords related to the hotel chain can be captured. Microbloggers' check-in information to hotels on Facebook®, Google® Plus, or Foursquare® can also be used to capture relevant microblog messages.

After retrieval, the captured microblog updates 106 go into the filter 102. At least one filter criterion can be used to remove automatically obvious spams and irrelevant microblog updates. In one embodiment, the filter 102 can consist of an on-line and off-line stage. In the on-line stage, microblog updates are captured in real-time and those updates which do not meet the filter criteria are discarded. The updates which do meet the filter criteria are tagged. In the off-line stage, a "corpus" can be built and used to train machine learning algorithms for filtering. The machine learning algorithms could be, for example, the Python®-based Natural Language Toolkit (NLTK), General Architecture for Text Engineering in Java®; MontyLingua in Python®/Java®; Distinguo in C++. The online/offline approach is just one possible embodiment for filtering. Other filtering techniques can also be used.

The filtered microblog updates 107 that remain after filter 102 are then moved to the learning stage 103, where prioritization takes place. In the prioritization process, a probability is assigned to the microblog update to indicate the confidence that the microblog update is actionable. Based on this probability, a priority can be assigned to the microblog update. Prioritization is carried out based on at least one prioritization criterion. Prioritization criteria could include popularity of the microblogger, influence of the microblogger, time differential between the event and the microblog update posted as a consequence of the event which caused the concern, and geographical proximity of the microblogger to the business where the event took place.

In one embodiment, the filtered microblog update is tagged with the results of the prioritization process. These tags can be used to shape the microblog update traffic to the following stages, so that an intelligent dropping policy can be applied in the case of congestion such that items with low probability of being actionable are discarded. In another embodiment, prioritization is implemented using machine learning algorithms, which can be self-tuning or auto-tuning, to make better and more intelligent selections. In one embodiment, similar to filtering, prioritization is implemented using an online-offline multistage approach as described previously. In the online stage, prioritization is carried out in real-time using for example machine learning algorithms or other adaptive techniques, and in the offline stage, a "corpus" is built and used to train machine learning algorithms, or other measures to improve the performance of adaptive techniques can be taken. These algorithms could be from a variety of sources, for example the Python®-based Natural Language Toolkit (NLTK), General Architecture for Text Engineering in Java®; MontyLingua in Python®/Java® or Distinguo in C++.

In the Twitter® monitoring process example, prioritization criteria which could be used include:

(a) Number of followers that the microblogger who posted the Tweet® has—the more followers a microblogger has, the more likely it is that it will be actionable.

(b) The influence score of a microblogger as determined by scoring services such as Klout.

(c) Time differential between microblogger update and event causing dissatisfaction—if a microblogger posts an update right after the event which caused dissatisfaction occurred, rapid feedback may ensure prompt resolution and reduction of customer dissatisfaction. This information could be obtained, for example, by looking for phrases such as "a few mins ago." Tweets® containing such phrases can be given a higher priority. Alternatively, this information could be estimated by looking at the microblogger's previous updates and comparing to when the Tweet® was sent out.

(d) Geographical information such as proximity of microblogger to business where event causing dissatisfaction occurred—if a microblogger is currently close to a business where the event causing dissatisfaction occurred, then there may be an opportunity to rectify the issue while the person is still within the same store. Store owners can offer a discount or coupon to even delight these microbloggers after addressing their concerns. Such information could be tracked, for example, by analyzing metadata and/or hashtags which are part of the Tweet® for geographical information. This can also be analyzed by using check-in information provided by the microblogger on Foursquare, Facebook®, Google® Plus and other networks.

(e) Results from monitoring other online social media network services. For example, a LinkedIn® monitoring service may determine that a microblogger is dissatisfied, and so Tweets® by this microblogger should be given a higher priority.

The Tweets® which have been prioritized are then inserted into the local database, and tagged with the results of the prioritization operation.

This can also be applied to monitoring processes for other microblogging and social network sites. For example, in the case of Facebook® for a hotel chain, prioritization criteria could include:

Number of friends that the microblogger has.

Results from monitoring other online social network services. For example, a LinkedIn° monitoring service may determine that a microblogger is dissatisfied, and so status updates by this microblogger should be rated more highly.

Geographical information such as proximity of microblogger to business where event causing dissatisfaction occurred. Facebook® offers its microbloggers the option of choosing the geographical location from which they are posting their status updates. This information can be tracked and used in prioritization.

The microblogger can be a fan of the business, or have commented on messages posted by the business, which would prioritize the microblogger higher than others.

The influence score of the microblogger.

The embodiment described above does not represent the only possible technique of performing capture, filtering and learning. Capture can be performed in a variety of ways. Other search engines such as Google®, Microsoft® Bing or Yahoo® can also be used. Furthermore, not all microblog and social media websites have search functionality as advanced as Twitter® or are as easily searchable. It may therefore be useful to have full-time teams of observers to observe social media websites and capture relevant microblog updates.

The prioritized microblog updates 108 are then moved into the final stage, classification 104. This is where microblog updates are classified as actionable or not. There are two main components to the classification stage: the classification component 104a, and the administrator statistics component 104b.

Figure 1A:
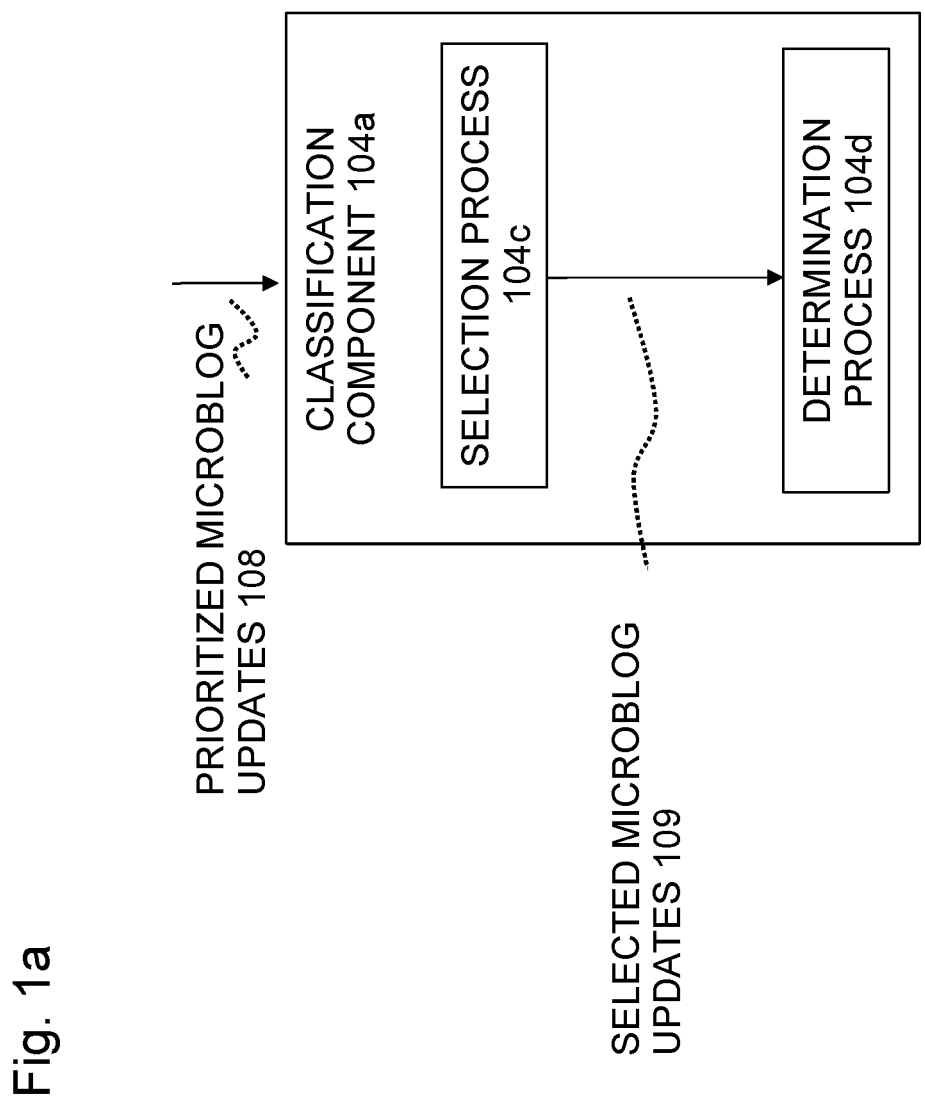

The classification component 104a is where decisions are made as to whether microblog updates are actionable. As shown in FIG. 1A, classification component 104a can be implemented for example using 2 processes—a selection process 104c and a determination process 104d.

During the selection process 104c, at least one selection criterion can be used to determine which microblog updates are selected from the database. Examples of selection criteria include:

Tags added in learning stage 103.

The newest/youngest microblog updates stored in the database could get selected first. This is the default method.

Non-discriminative selection where all microblog updates in the database have an equal chance of being up for classification.

Ordered selection where the microblog updates with highest probability values from the learning stage could be selected first (thus improve the chance of encountering actionable microblog updates).

An above-threshold selection where the classifier only sees microblog updates that are above a certain probability value from the learning stage.

Similar to prioritization during learning stage 103, different machine learning algorithms including self-tuning or auto-tuning algorithms can also be used in the selection process 104c to make better and more intelligent selections. In addition, the selection process 104c can be implemented in a distributed manner. Furthermore, during the selection process 104c, microblog updates can be tagged, in a similar way to that described during learning stage 103. Similar to both filter 102 and learning stage 103, selection can be implemented using an online-offline multistage approach as described previously. In the online stage, selection can be carried out in real-time using for example machine learning algorithms or other adaptive techniques, and in the offline stage, a "corpus" can be built and used to train machine learning algorithms, or other measures to improve the performance of adaptive techniques can be taken. The machine learning algorithms could be, for example, the Python®-based Natural Language Toolkit (NLTK), General Architecture for Text Engineering in Java®; MontyLingua in Python®/Java®;

Just as during the learning stage 103, microblog updates can be tagged as part of the selection process 104c. Combinations of tagging operations are also possible. For example, a first, tagging operation can be performed during learning stage 103 to give each update a low, medium or high priority tag. A second tagging operation can then be performed during the selection process 104c to further distinguish between high priority tagged updates. For example, high priority tagged updates can further be tagged as class 1, 2 or 3. Multiple tagging operations can be performed in either stage. Similar to that described during the learning stage 103, the tags can be used during selection process 104c to perform traffic shaping. For example, an intelligent dropping policy can be applied such that updates with low probability of being actionable are discarded. To illustrate, continuing on from the previous tagging example, those updates tagged as high priority during learning stage 103 and then further tagged as class 3 during the selection process 104c could be dropped, as updates with these tags may have previously been found to have a low probability of being actionable.

Once the microblog updates have been selected, the selected microblog updates 109 are directed to the determination process 104d. In the determination process 104d, the actionability of microblog updates are determined. In one embodiment of the determination process 104d, classifiers determine the actionability of the microblog update. Note that the determination process 104c is the same regardless of how the selection is carried out. The selection process 104c is intended to tune the system to be more responsive to detect the right set of actionable microblog updates. This could be achieved, for example, by making the system more responsive to new microblog updates or to obviously actionable microblog updates. The tags can be used to improve the organization and presentation of microblog updates to classifiers. Like selection, determination can also be implemented in a distributed overlapped manner, where two or more classifiers vote on the actionability of the microblog update. This distributed voting system can help facilitate the use of statistical methods to improve the quality of the determination process 104d, and therefore the entire classification stage 104.

The classifiers participating in the determination process do not have direct access to the tags applied during either the selection process 104c or learning stage 103, so the tag has no impact on the classifiers' decisions. Therefore the tags can be used by administrators to monitor the quality of the classifiers' decisions and improve the evaluation process.

Administrators will try to, for example, minimize the following errors: determining that a non-actionable update is actionable, determining that an actionable update is non-actionable For example, flags can be raised for a particular classifier, if that classifier consistently determines that microblog updates which were tagged as high priority are non-actionable, or the classifier continually determines that microblog updates which were tagged as low priority are actionable. Tagging when implemented together with distributed voting can also be used to reduce potential human errors, and to ensure that high-performing classifiers are recognized appropriately. Implementing a more sophisticated selection process reduces the need for extensive classifier training before performing the determination.

In one embodiment, the determination process 104d of the classification component can be implemented in a web site, where classifiers manually go through pages of microblog updates selected from a database to determine which microblog updates are actionable. Classifiers perform determination through a web browser of their choice, where the web browser serves up the classification page displaying a brief explanation of the goal, a number of microblog updates about a specific business, radio buttons for each microblog updates so that each microblog update's status can be marked as actionable or non-actionable, and a submit button once the actionability of all the microblog updates have been determined. Upon submit, an invitation will be sent on the business's behalf to the author of each Tweet® determined as actionable to participate in giving feedback.

In another embodiment, in addition to the actionable status and non-actionable status, a third status, "undecided," can be assigned by a first classifier. All updates which have "undecided" as their status can be reviewed by a second classifier, who will determine which of the updates marked as undecided are actionable or non-actionable. It is also possible to use a team of classifiers to vote on the updates marked as undecided to determine whether these updates are actionable or non-actionable.

In another embodiment, the determination process 104d can be fully automated. This automated determination process can be implemented in different ways. In one embodiment, based on the results of the prioritization in learning stage103 and the results of the selection process 104c, the determination process 104d could include steps to calculate and assign an actionability score to each microblog update. The determination process could compare this actionability score against a threshold value to determine whether the microblog update was actionable or not.

Various calculation techniques could be used to calculate an actionability score. In one embodiment, the calculation technique which the determination process 104d uses could be chosen by the administrators after viewing the results from using different calculation techniques.

In one embodiment, the threshold could be set using the online-offline approach. In the online stage, determination of actionability of an update occurs in real time. In the offline stage, a "corpus" can be built and used to train machine learning algorithms to set the threshold so as to minimize error rates. The machine learning algorithms could be, for example, the Python®-based Natural Language Toolkit (NLTK), General Architecture for Text Engineering in Java®; MontyLingua in Python®/Java®; Distinguo in C++. This online/offline approach is just one embodiment for setting thresholds. Other threshold-setting techniques can also be used.

In addition, using a single, "global" threshold may not be the most optimal approach. In another embodiment, different thresholds may be set for different individuals, or different groups of individuals. These thresholds may be set by, for example, considering historical error rates or the nature of the industry or businesses. The thresholds can also be set by viewing the results of determination stages for other types of microblog updates. The online-offline approach can be used to set these thresholds.

Calculating an actionability score and comparing this score to a threshold is one embodiment of the automated determination process. In another embodiment, two thresholds can be set, one lower than the other. Updates with scores below the lower threshold will be considered non-actionable. Updates with scores above the upper threshold will be considered actionable. Updates with scores between the lower and upper thresholds will be considered as undecided.

The lower and upper thresholds can be continually adjusted using the online-offline approach discussed earlier. Upon adjustment of the thresholds, those updates which were previously considered as undecided will be compared against the adjusted thresholds. The status of these updates may possibly be changed to actionable or non-actionable, or may remain the same.

In addition, it is possible to use a combination of human and automated processes. For example, in another embodiment, the automated process will use the two-threshold process discussed above, to sort updates into actionable, non-actionable or undecided. After this; classifiers can sift through the undecided updates and classify these updates into either actionable or non-actionable. Other combinations of human and automated determination processes can also be used.

Figure 1B:
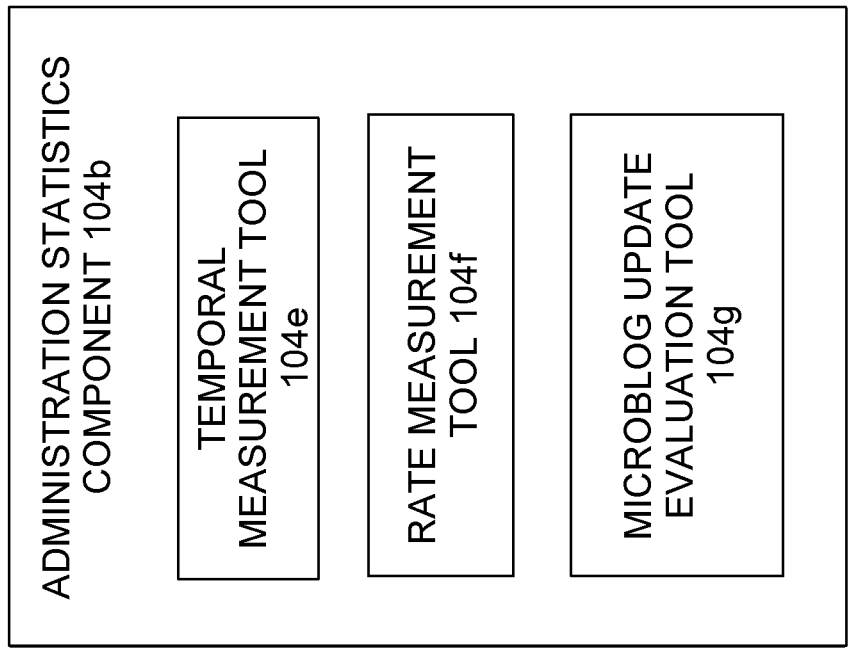

The administrator statistics component 104b allows an administrator to monitor the progress of the classification component. As shown in FIG. 1b, it contains three monitoring tools: a temporal measurement tool 104e, a rate measurement tool 104f and a microblog update evaluation tool 104g. The temporal measurement tool 104e is used to measure the amount of classification activity that has taken place within a certain time period. The rate measurement tool 104f is used to measure the rate at which that activity has been carried out. Finally, the microblog update evaluation tool 104g can be used by the administrator to view the microblog updates which have been classified. The results obtained by using the microblog update evaluation tool 104g can be used as feedback to improve the performance or tune algorithms implemented during the previous stages.

In one embodiment, the administrator statistics component 104b consists of various different pages accessed also via a web browser. The results from using the various monitoring tools are displayed on these pages. These numbers, as well as others also on the "admin home page," allow administrators to know at a brief glance whether the system is up and running, and also how well the system is doing. Administrators can easily monitor the classifier application via these statistics pages.

A web site to partially implement the classification stage for the Twitter® monitoring process example used in this specification, is described in the section titled "Detailed Description of the Classification Stage."

The final stage, action 111, is where actionable updates 110 from the classification stage are acted upon. Possible actions include asking the microbloggers of these updates to provide feedback, or having the business contact the microbloggers to rectify any concerns or issues. The business can also reach out to all the microbloggers to find out more about what caused them to write these updates or messages. Combinations of actions are also possible, such as asking the microbloggers to provide feedback and sending discount coupons to those microbloggers who provided feedback.

The process described above is one possible embodiment of the invention. Different embodiments are also possible.

Figure 1C:
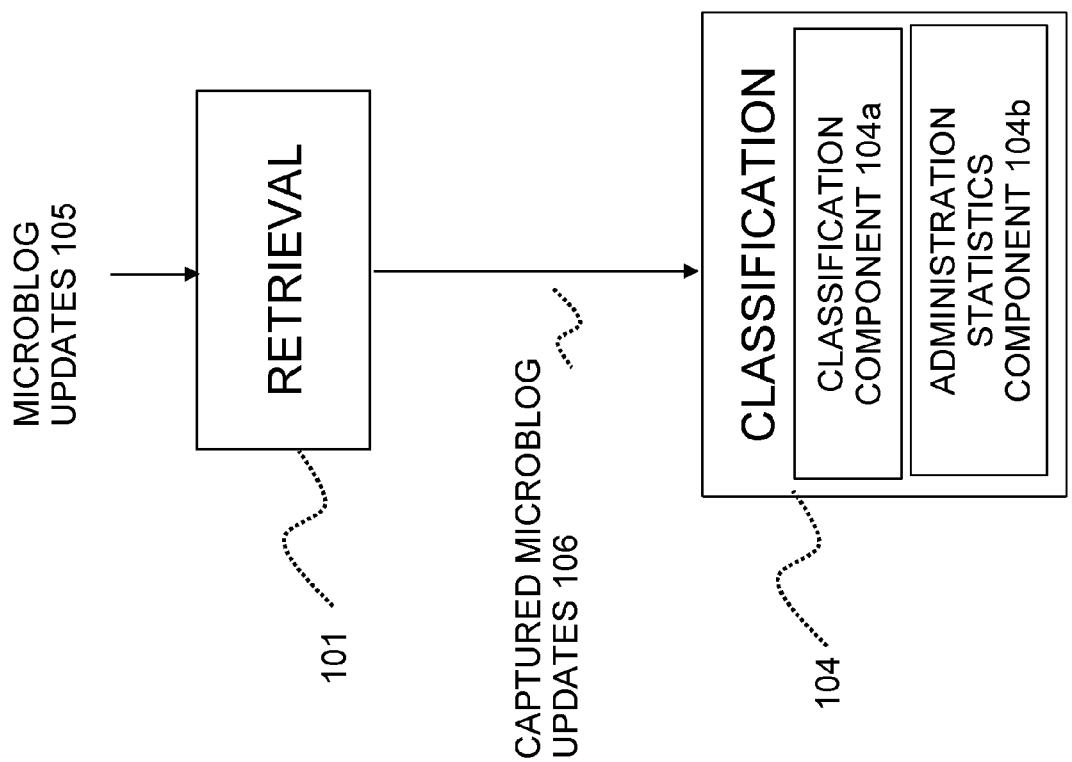

FIG. 1c illustrates another embodiment of a system for extracting customer feedback from a microblog site by sending captured microblog updates 106 directly after a retrieval stage 101 to a classification stage 104. Filtering occurs in the classification component 104a within the classification stage 104. Actionable updates 110 are sent to the action stage 111 to be acted upon.

Figure 1D:
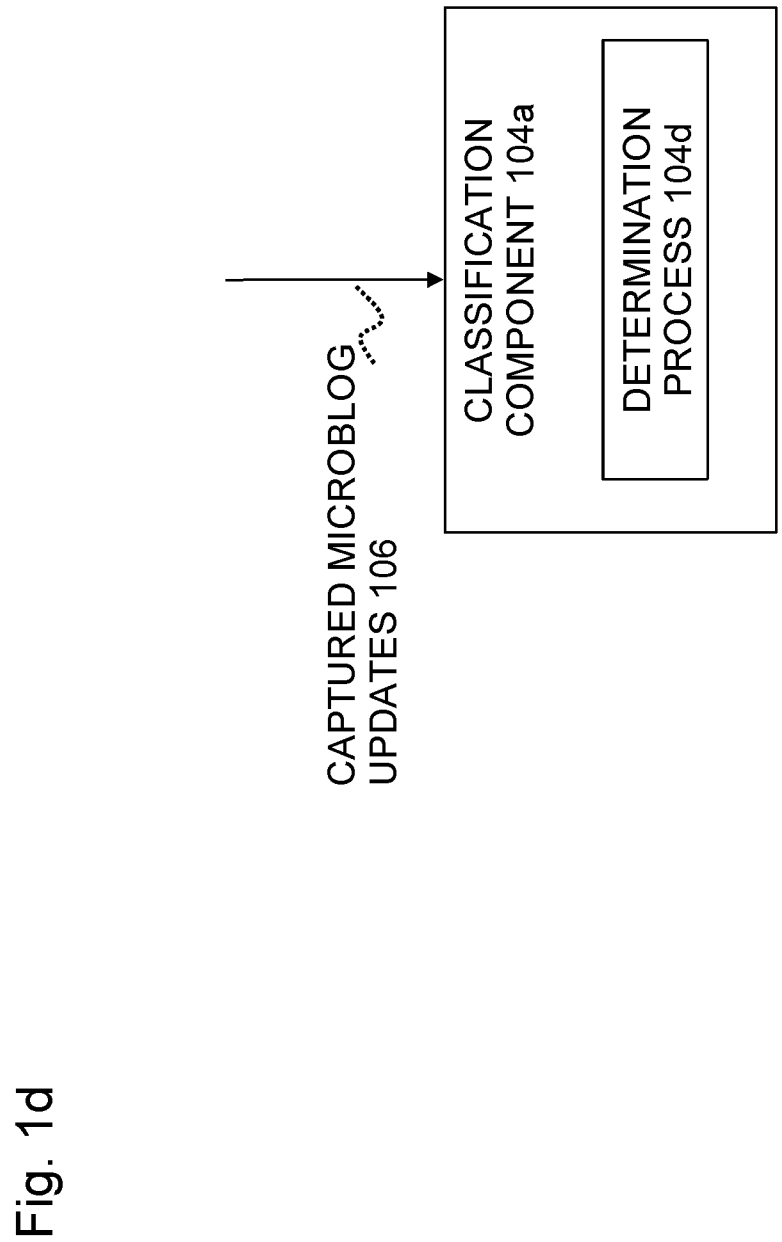

Another possible embodiment is shown in FIG. 1d. In this embodiment, captured microblog updates 106 can be sent directly to the determination process 104d within the classification component 104a, of classification stage 104.

Figure 1E:
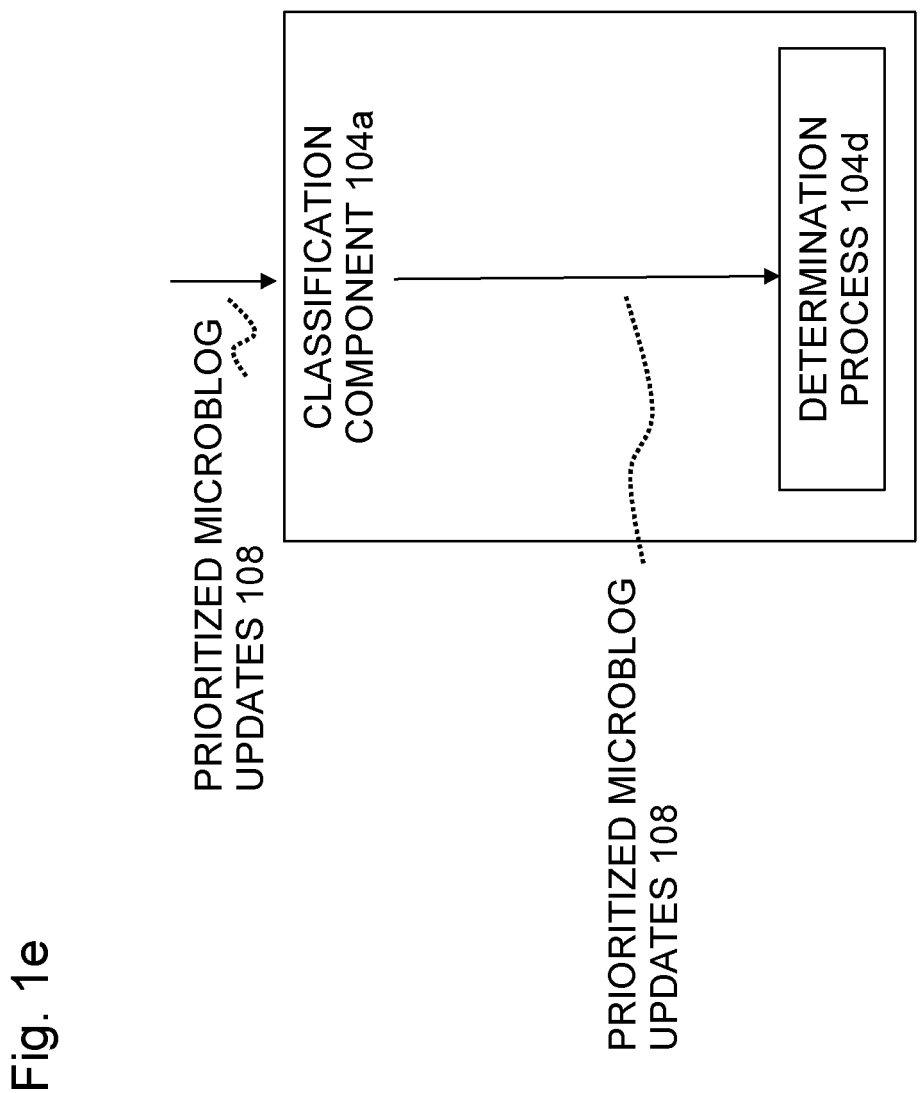
Figure 1F:
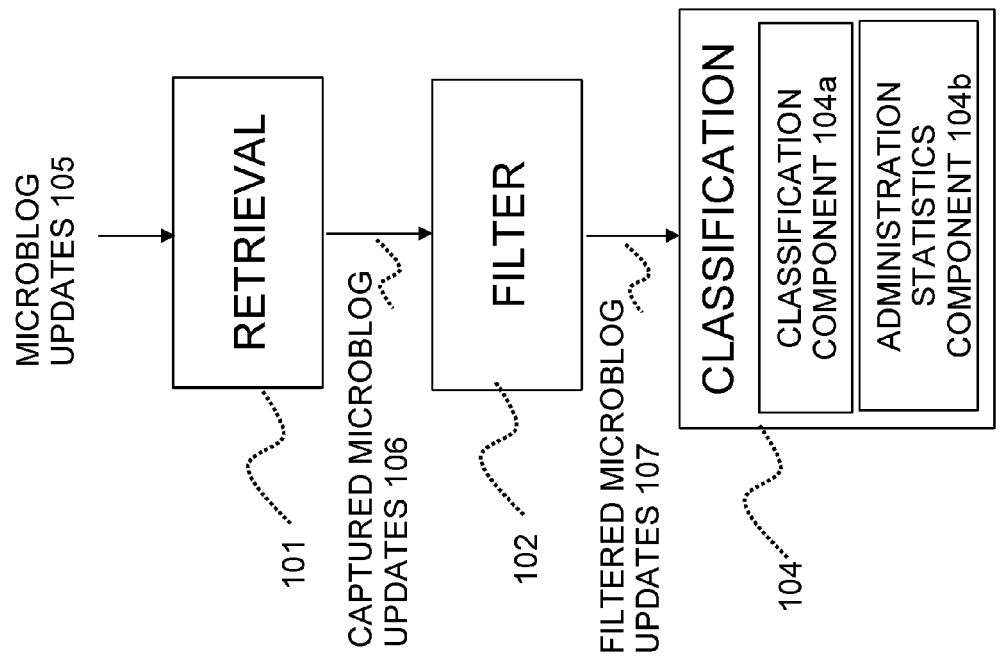

Another possible embodiment is shown in FIG. 1e. In this embodiment, prioritized microblog updates 108 are sent directly to determination process 104d within the classification component 104a, of classification stage 104.

As shown in FIG. if another possible embodiment is to send filtered microblog updates 107 after the filter stage 102 directly to the classification stage 104. Actionable updates 110 are then sent to the action stage 111 to be acted upon.

Figure 1G:
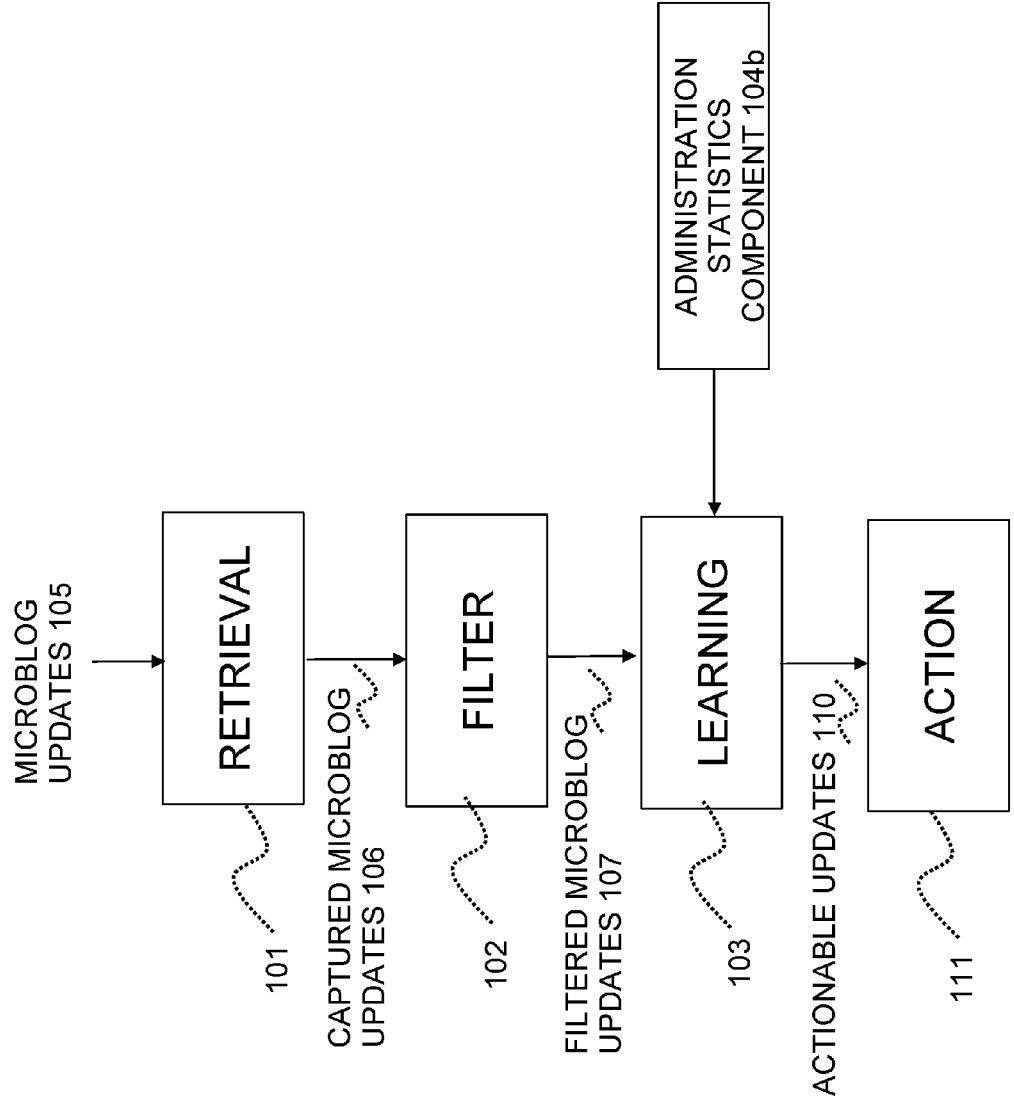

As shown in FIG. 1g, another possible embodiment is to set the status of microblog updates which are above a certain priority level to actionable within the learning stage, and send these actionable updates 110 directly to the action stage 111. The administration statistics component 104b is used to maintain oversight of the learning stage 103, and to control error rates.

Furthermore, while the description above uses Facebook® and Twitter® as examples, the same process could be applied to other microblogging and social network sites.

Detailed Description of the Classification Stage

FIGS. 2-9 relate to a web site used to partially implement the classification stage for the Twitter® monitoring process example used in this specification. In particular, the use of the web site for the manual implementation of the determination process by classifiers within the classification component, and the implementation of the administrator statistics component, are described in this section.

Classification Component

Figure 2:
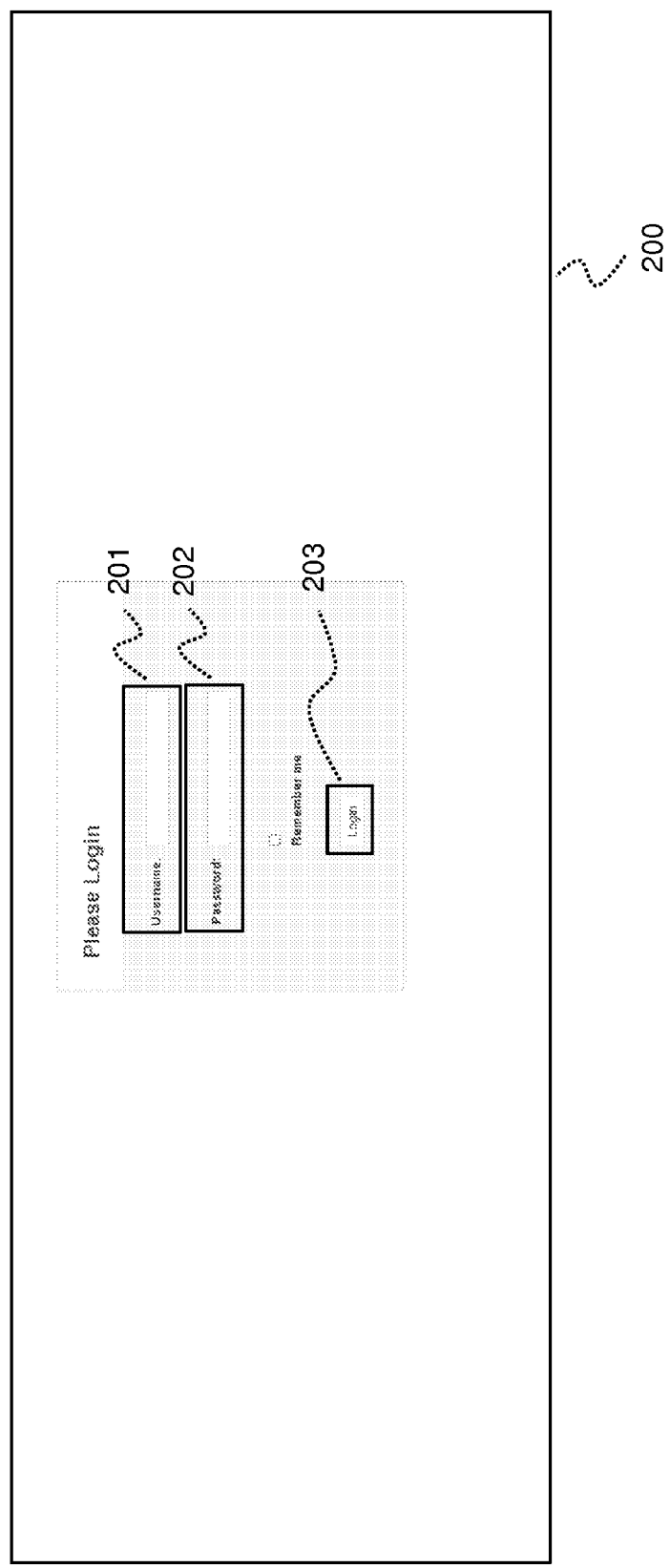
FIG. 2 is an example of a login page for a classification component.

FIG. 2 shows a Login page 200 that a classifier can use during the determination process to access the classification web site. Once the classifier has supplied the correct username in field 201 and password field 202, and clicks on Login button 203, the classifier is directed to a classification web page. The classification page 300 is shown on FIG. 3.

Figure 3:
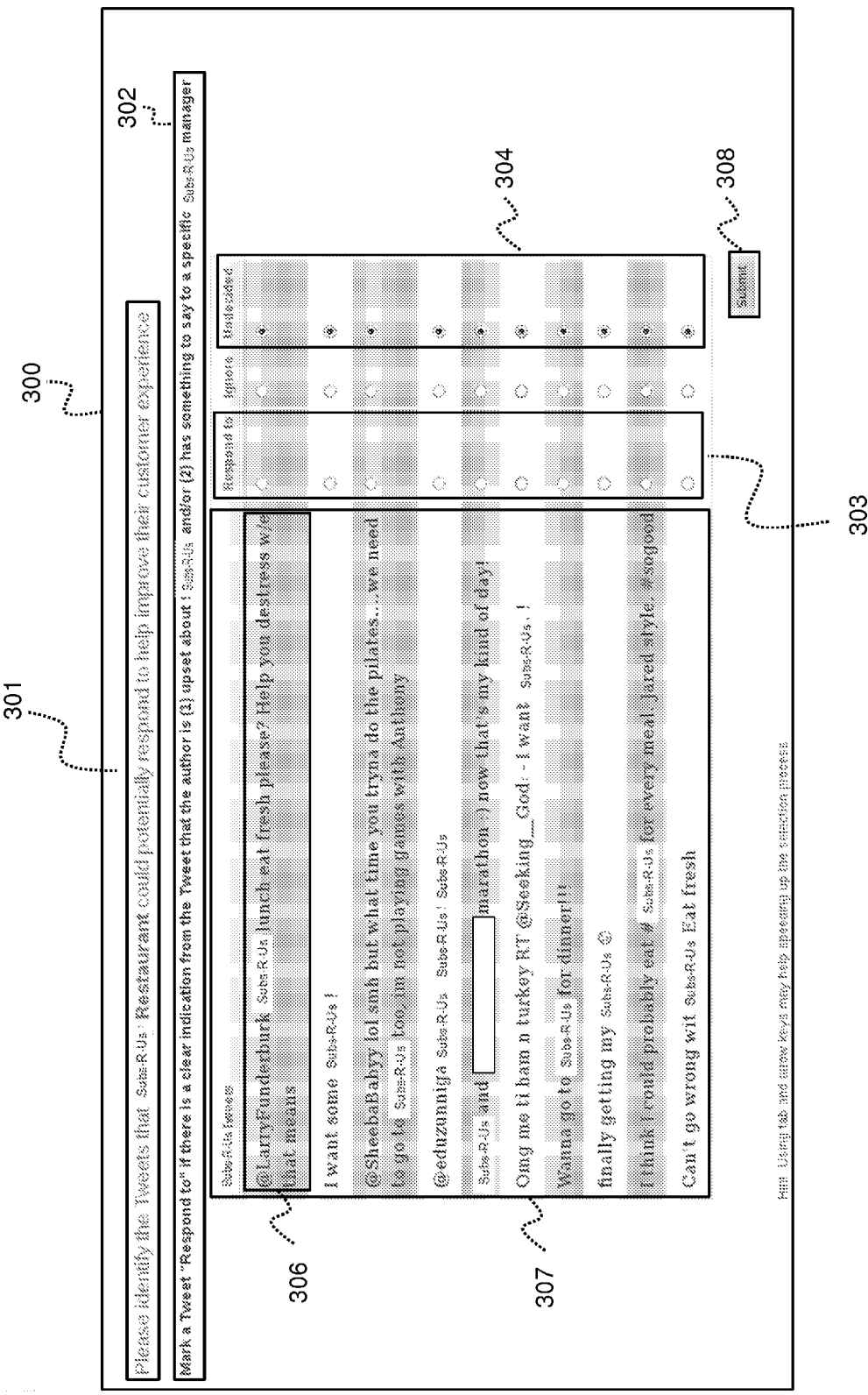
FIG. 3 is an example of a classification page.

Referring to FIG. 3 which shows classification page 300 it can be seen for example by reading header 301 that the business objective is improving a food chain (in this case Subs-R-Us) customer experience by filtering Twitter® updates. As per instruction 302, a classifier will mark a Tweet® for example Tweet® 306 from the Tweets® in table 307 as "Respond to" in field 303 i.e. identify a Tweet® as actionable if the microblogger is upset about Subs-R-Us and has something to say to a specific Subs-R-Us manager.

A Few Things To Note:

If the classifier leave the selection as "Undecided" by, for example, marking as such in field 304 for any Tweet® in field 307 and presses submit button 308, those "Undecided" Tweets® will return to the pool of unclassified Tweets® as if they have never been classified. These Tweets® could possibly be given to different classifiers to decide whether they are actionable or not.

To discourage classifiers from spending too much time on single page, a message will show up after two minutes suggesting that the classifiers refresh their page as the Tweets® that they have on their screen may be outdated.

A tooltip bubble will pop up and display the time at which the Tweet® was written if the classifiers hover their mouse cursors over the Tweet®.

There could be different variations of the classification page, each variation corresponding to a different selection criteria for selecting Tweets™ from the database. Examples of different variations include pages where:

The most recent Tweets® available are shown (FIG. 3)

Figure 4:
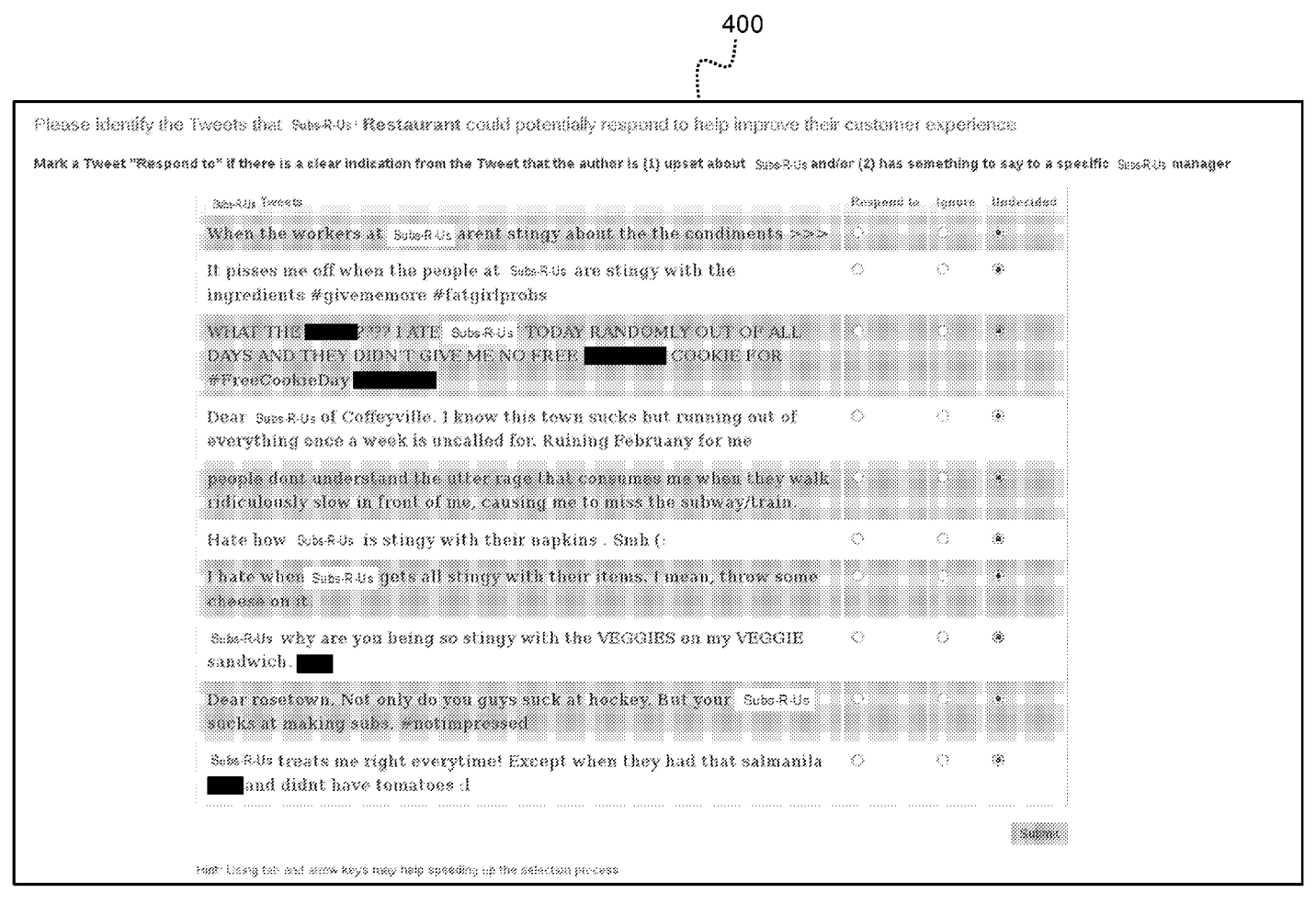

The Tweets® with highest probabilities assigned during the learning stage are shown as demonstrated on page 400 in FIG. 4.

Only Tweets® with probabilities higher than a threshold will show up.

All Tweets® in the database will show up, no matter how old they are Also, a classifier can specify which business's Tweets® will show up on the classification page.

Administrator Statistics

Figure 5:
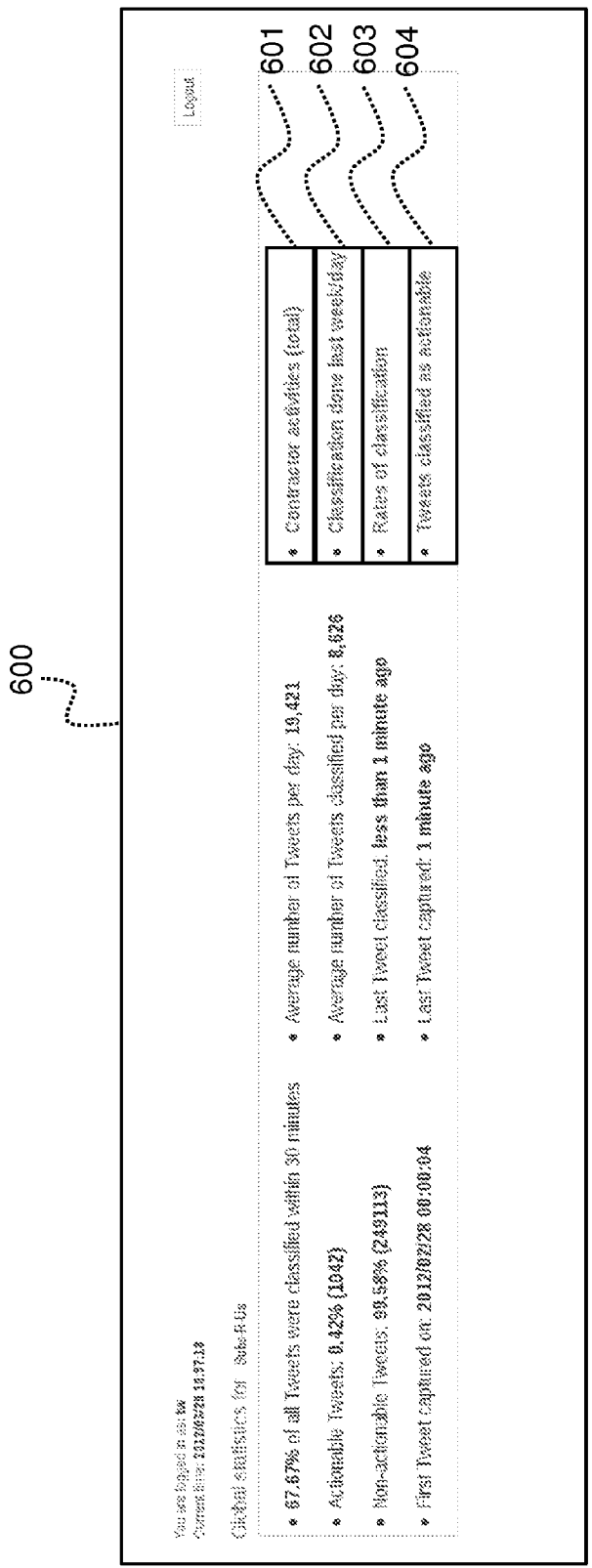
FIG. 5 is an example of another version of the administrator statistics home page that only shows one business at a time.

FIG. 5 shows part of an administrator statistics home page 600.

As discussed previously, the administrator statistics component contains three tools: a temporal measurement tool, a rate measurement tool and a Tweet® evaluation tool. On the right-most column of page 600 are four links 601-604 corresponding to pages which allow an administrator to view the results from the use of these three tools. Link 601, "Contractor activities (total)", and link 602, "Classification done last week/day" allow an administrator to view the results obtained by the temporal measurement tool. Link 603, "Rates of classification" allows an administrator to view the results obtained by the rate measurement tool. Link 604 allows an administrator to evaluate the Tweets® which have been classified.

Figure 6:
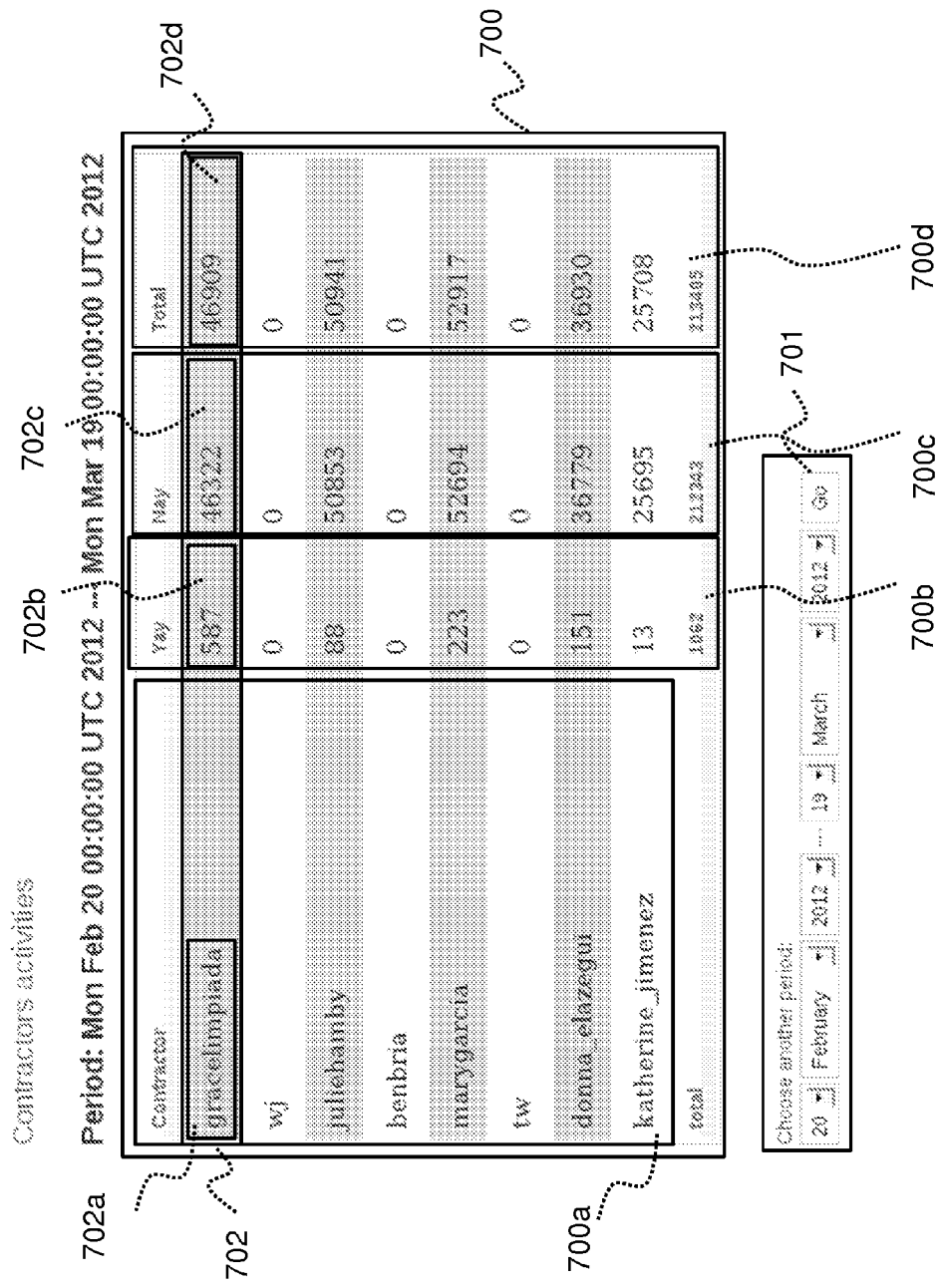
FIG. 6 is an example of a page which shows the long-term contribution of each of a plurality of classifiers and of their combined total.

Link 601 brings the administrator to the page shown in FIG. 6. This page shows the long-term contribution of each classifier and of their combined total in table 700. The "Contractor" column (column 700*a*) shows the names of the classifiers. The "Yay" column (column 700*b*) displays the number of actionable Tweets® that were classified by each row's corresponding classifier, and the "Nay" column (column 700*c*) displays nonactionable Tweets®. The "Total" column (column 700*d*) shows the totals for each classifier. Breaking down further, row 702 shows that classifier gracelimpiada (entry 702*a*) has completed classifying 46909 Tweets® (entry 702*d*), with 587 "Yay" (entry 602*b*) and 46322 "Nay" (entry 702*c*). Notice the date range 701 is customizable.

Figure 7:
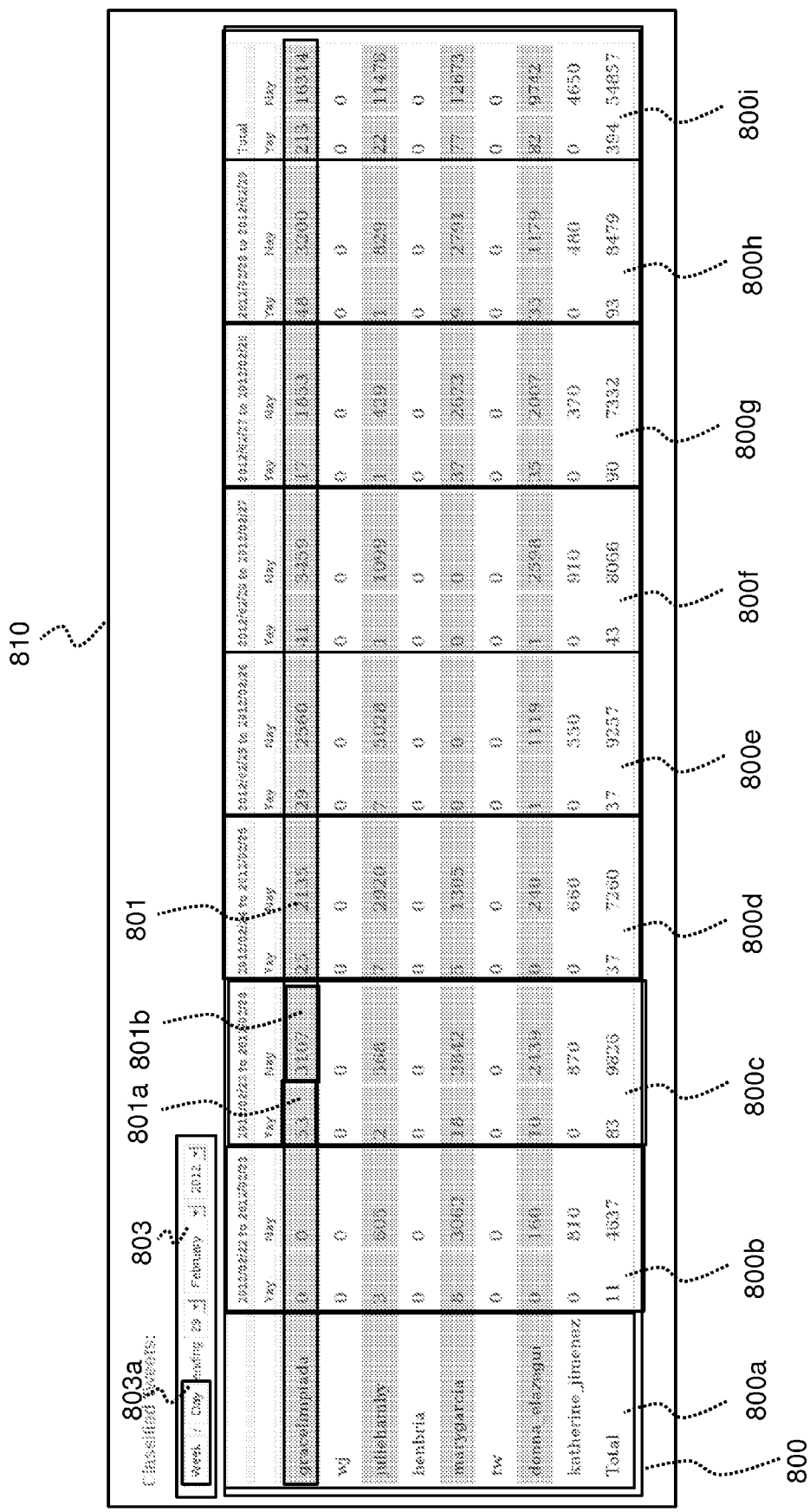
FIG. 7 is an example of a web page with a table showing a day-by-day breakdown of classifiers' classifications for a week.

Link 602 on the right-most column of page 600 of FIG. 5, "Classification done last week/day", gives a more focused view on each classifier's activity during a short time frame. FIG. 7 shows web page 810 that will be brought up Table 800 shows a day-by-day breakdown of "Yay" and "Nay" for each classifier for the week from 22 Feb. 2012 to 29 Feb. 2012. Column 800*a* shows the names of the classifiers who have been classifying Tweets®. Column 800*b* -800*h* shows the "Yay" and "Nay" for each daily period, starting from the daily period of 22 -23 Feb. 2012 to the final daily period of 28-29 Feb. 2012. Column 800*i* shows the total "Yay" and "Nay" for each classifier over the period. Breaking down further, row 801 shows the "Yay" and "Nay" for classifier gracelimpiada over the 7-day period. Cells 801*a* and 801*b* show 53 Yay and 3107 Nay respectively for the period from 23 Feb. 2012 to 24 Feb. 2012. The numbers in each table cell (other than the total column and total row) are links that would take the administrator to a separate page where he or she can examine the actual Tweets® that were classified. So, clicking on cells 801*a* and 801*b* would take the administrator to the 53 actual Tweets® marked Yay and 3107 Tweets® marked Nay that were actually classified.

The duration and the end date can be set in field 803. If button 803*a* is set to "Day", i.e. "Day" view, then the activities will he broken down into hourly chunks.

Figure 8:
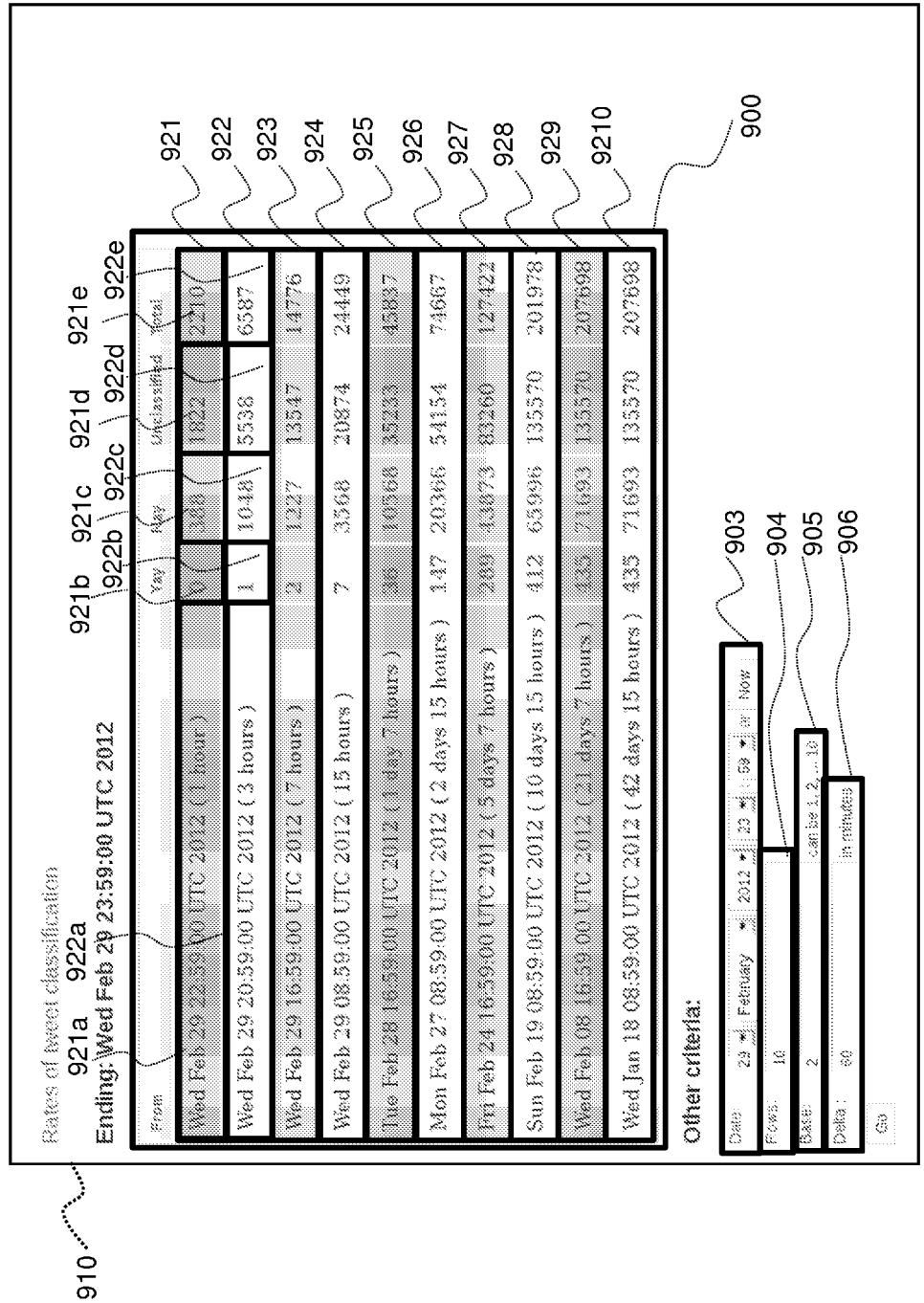
FIG. 8 is an example of a page containing a table with classification rates measured by a rate measurement tool.
Figure 9:
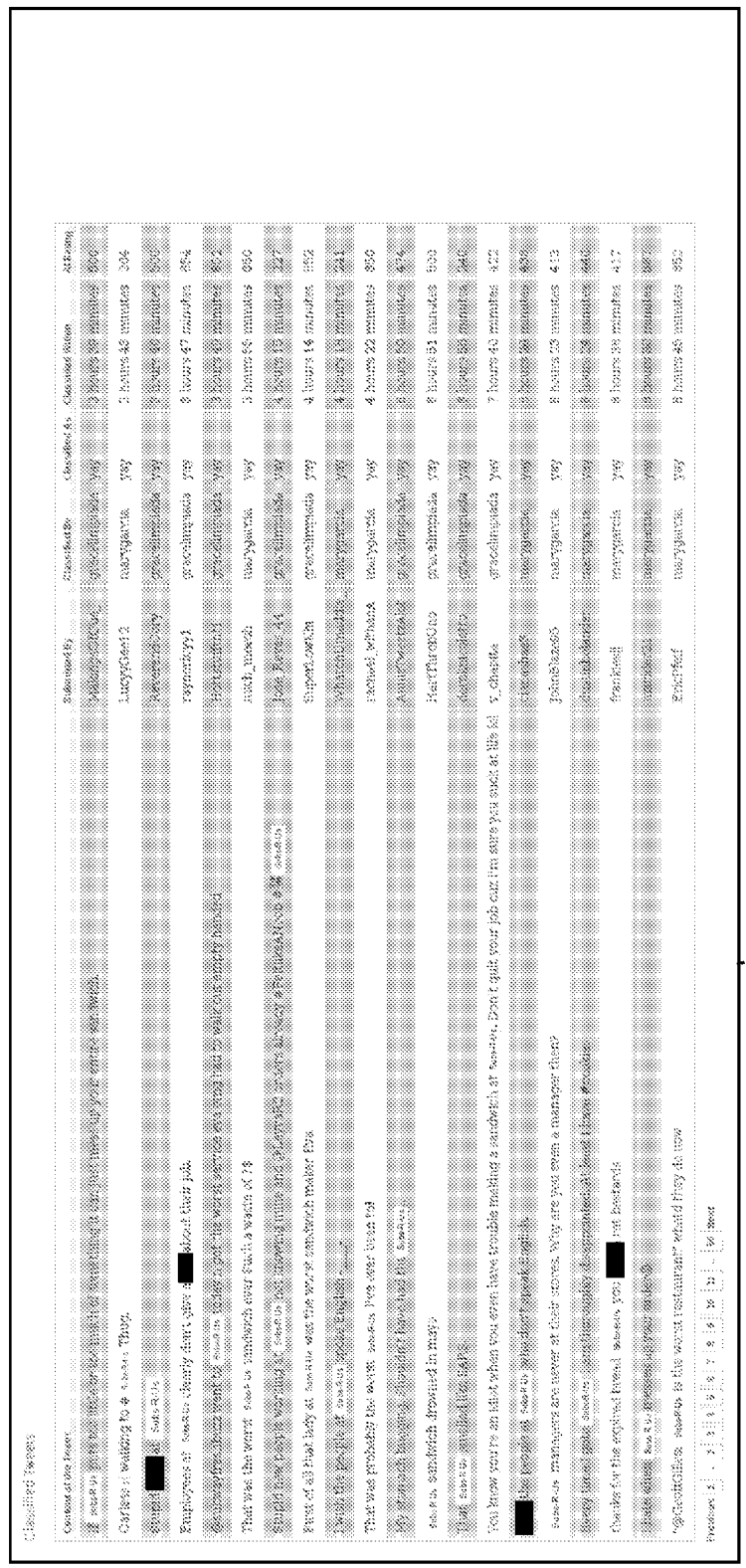
FIG. 9 is an example of a page displaying all Tweets® classified as actionable in the database.

Link 603 on the right-most column of page 600 of FIG. 5, "Rates of classification" shows the classification rates, these rates being measured by a rate measurement tool within the last set intervals. FIG. 8 shows page 910 containing table 900. Consider row 921 of table 900. Cell 921*a* indicates that row 921 will contain classification data pertaining to Tweets® that are less than 1 hr old. Cell 921*b* shows that 0 were classified as Yay or actionable and cell 921*c* shows that 388 were classified as Nay or non-actionable. Cell 921*e* shows that there is a total of 2210 Tweets® that were less than 1 hour old. Consider row 922. Cell 922*a* indicates that row 922 will contain classification data pertaining to Tweets® that are less than 3 hrs old. Cell 922*e* of row 922 shows that there is a total of 6587 Tweets® that were less than 3 hours old, 1 of which were classified as actionable (cell 922*b*) and 1048 of which were classified as non-actionable (cell 922*c*).

There are some criteria that the administrator may wish to modify to see different time ranges and intervals. He or she may choose a different date in field 903 or have the table contain more rows by changing field 904. The base field 905 dictates how fast the intervals grow, whereas delta field 906 dictates how "big" each step is. In table 900, the interval for the $n^{th}$ row is given by $$\text{Interval for } n^{th} \text{ row} = \sum_{x=1}^{x=n} \text{delta} \times \text{base}^{x-1}$$

If base=1, the interval for the $n^{th}$ row is given by:

$$\text{Interval for } n^{th} \text{ row} = \text{delta} \times \left(\frac{1 - \text{base}^n}{1 - \text{base}}\right)$$

If base=1, the interval for the $n^{th}$ row is given by:

Interval for $n^{th}$ row=delta×$n$

In FIG. 8, base field 905 is set to 2, and delta field 906 is set to 60 mins (1 hr), then the interval in hours with respect to ending time (which is current time, if not manually choosing a different date) is given in Table 1.

TABLE 1

Interval size for base = 2, delta = 60 mins (1 hr)
Base = 2, delta = 60 mins (1 hr)

| Row | Interval (hrs) |
|---|---|
| 921 | 1 |
| 922 | 3 |
| 923 | 7 |
| 924 | 15 |
| 925 | 31 (1 day 7 hrs) |
| 926 | 63 (2 days 15 hrs) |
| 927 | 127 (5 days 7 hrs) |
| 928 | 255 (10 days 15 hrs) |
| 929 | 511 (21 days 7 hrs) |
| 9210 | 1023 (42 days 15 hrs) |

Some other examples are demonstrated below in Tables 2 and 3:

TABLE 2

Interval size for base = 2, delta = 20 mins
Base = 2, delta = 20 mins

| Step | Interval (mins) |
|---|---|
| 1 | 20 |
| 2 | 60 |

TABLE 2-continued

Interval size for base = 2, delta = 20 mins
Base = 2, delta = 20 mins

| Step | Interval (mins) |
| --- | --- |
| 3 | 140 |
| 4 | 300 |
| 5 | 620 |

TABLE 3

Interval size for base = 1, delta = 15 mins
Base = 1, delta = 15 mins

| Step | Interval (mins) |
| --- | --- |
| 1 | 15 |
| 2 | 30 |
| 3 | 45 |
| 4 | 60 |
| 5 | 75 |

Note that these formulas are not the only formulas which can be used. Other formulas can be used, for example, the steps can grow quadratically, linearly or logarithmically, or determined by administrators manually.

Similar to the week/day view of classifier activities, the Yay (actionable) and Nay (non-actionable) cells in this table are also links that lets administrators examine the exact Tweets® that were classified. In the case of the distributed overlapped implementation, the number shown on the link and the actual number of Tweets® being displayed once clicking the link may be different as more than one person has classified the Tweet®).

Finally, link 604 on the right-most column of page 600 of FIG. 5 allows an administrator to evaluate the Tweets® that have been classified as actionable. It leads the administrator to page 1000 of FIG. 9 where all Tweets® classified as actionable in the database show up. In the case of the distributed overlapped implementation, this page can be modified to show, for example, the extent to which a given classifier's determination decisions are supported by another classifier and other statistics.

This can help facilitate the use of statistical methods to improve the quality of the determination process, and therefore the entire classification process. It also assists administrators in controlling and supervising classifiers, so as to eliminate potential fraud, and to ensure that high-performing classifiers are rewarded appropriately.

Similar as before, hovering a mouse cursor over the Tweet® contents will trigger a tooltip displaying the time when the Tweet® was published.

While particular embodiments and applications of the present invention have been illustrated and described, it is to be understood that the invention is not limited to the precise constructions and compositions disclosed herein and that various modifications, changes, and variations may be apparent from the foregoing descriptions without departing from the spirit and scope of the invention as defined in the appended claims.

The invention claimed is:

1. A method for extracting customer feedback from a first microblog site using a database, and one or more automated tools comprising a retrieval unit, a filter unit, a learning unit, and a classification unit, said method comprising:
   capturing, by the retrieval unit, microblog updates posted by customers from the first microblog site;
   filtering, by the filter unit, the captured microblog updates according to filter criteria that removes non-actionable items from the captured microblog updates; and
   prioritizing, by the learning unit, the filtered microblog updates, wherein said prioritizing comprises
   assigning probabilities to corresponding filtered microblog updates,
   assigning priorities to said corresponding filtered microblog updates based on said assigned probabilities,
   storing the corresponding filtered microblog updates in the database after assigning said priorities,
   tagging the corresponding filtered microblog updates in the database based on the corresponding assigned priorities; and
   classifying, by a classification unit, the filtered and prioritized microblog updates, and
   wherein said classifying comprises selecting at least some of the prioritized microblog updates from the database based on said tagging.

2. The method of claim 1, wherein said assigning of probabilities further depends on influence scores of the customers determined using one or more scoring services different from the first microblog site.

3. The method of claim 1, wherein said assigning of probabilities further depends on proximities of the customers to businesses associated with the filtered microblog updates, said proximities determined by analyzing metadata, hashtags associated with said filtered microblog updates, and check-in information obtained from one or more sites different from said microblog site.

4. The method of claim 1, wherein said prioritizing comprises discarding at least one of the filtered microblog updates based on said tagging.

5. The method of claim 4, wherein said discarding is based on an intelligent dropping policy.

6. The method of claim 1, wherein said classifying further comprises determining whether each selected microblog update is actionable.

7. The method of claim 5, wherein said discarding is further based on congestion levels.

8. The method of claim 1, wherein said assigning of probabilities is based on popularity of each of the customers based on number of followers of said customer on said first microblog site.

9. The method of claim 1, wherein said assigning of probabilities is based on results from monitoring one or more microblog sites different from said first microblog site for one or more postings made by the customers.

10. The method of claim 1, further wherein each said assigned probability is used to indicate confidence that the corresponding filtered microblog update is actionable.

* * * * *